(12) United States Patent
Sadowski

(10) Patent No.: US 7,049,555 B2
(45) Date of Patent: May 23, 2006

(54) ELECTRICAL SLEEVE HEATER

(75) Inventor: Andre Sadowski, Altena (DE)

(73) Assignee: Hotset Heizpatronen U. Zubehor GmbH, Ludenscheid (DE)

( * ) Notice: Subject to any disclaimer, the term of this patent is extended or adjusted under 35 U.S.C. 154(b) by 0 days.

(21) Appl. No.: 10/680,845

(22) Filed: Oct. 7, 2003

(65) Prior Publication Data

US 2004/0069771 A1   Apr. 15, 2004

(30) Foreign Application Priority Data

Oct. 11, 2002 (DE) ................................ 102 47 509

(51) Int. Cl.
 *H05B 3/58* (2006.01)

(52) U.S. Cl. ...................... 219/535; 219/424; 219/546; 219/549; 219/536; 425/549

(58) Field of Classification Search ................ 219/535, 219/544, 385, 521, 438, 441, 528, 529, 549, 219/548, 546, 536; 425/549; 439/843; 285/21.1; 392/441, 443, 424
See application file for complete search history.

(56) References Cited

U.S. PATENT DOCUMENTS

| | | | | | |
|---|---|---|---|---|---|
| 3,849,630 | A | * | 11/1974 | Halliday | 219/535 |
| 5,558,888 | A | * | 9/1996 | Beck | 425/549 |
| 5,687,996 | A | * | 11/1997 | Steinmetz et al. | 285/21.1 |
| 6,163,016 | A | * | 12/2000 | Johnson et al. | 219/424 |
| 6,482,049 | B1 | * | 11/2002 | Swearingen | 439/843 |
| 6,680,464 | B1 | * | 1/2004 | Carter et al. | 219/544 |

* cited by examiner

*Primary Examiner*—Robin O. Evans
*Assistant Examiner*—Leonid M. Fastovsky
(74) *Attorney, Agent, or Firm*—Herbert Dubno; Andrew Wilford

(57) ABSTRACT

A sleeve heater has an electrical and generally cylindrical heater coil centered on an axis and shaped to fit over a part to be heated, a radially compressible and generally cylindrical inner sleeve snugly coaxially surrounding the heater coil, and a radially generally inextensible and generally cylindrical outer sleeve fitted coaxially over the inner sleeve. The outer sleeve has an inner surface bearing tightly radially inward on the inner sleeve and radially compressing the inner sleeve and the coil inward. The inner sleeve is formed with two or more axially extending and axially oppositely open slots that are angularly equispaced, with alternate slots open axially in opposite directions.

14 Claims, 1 Drawing Sheet

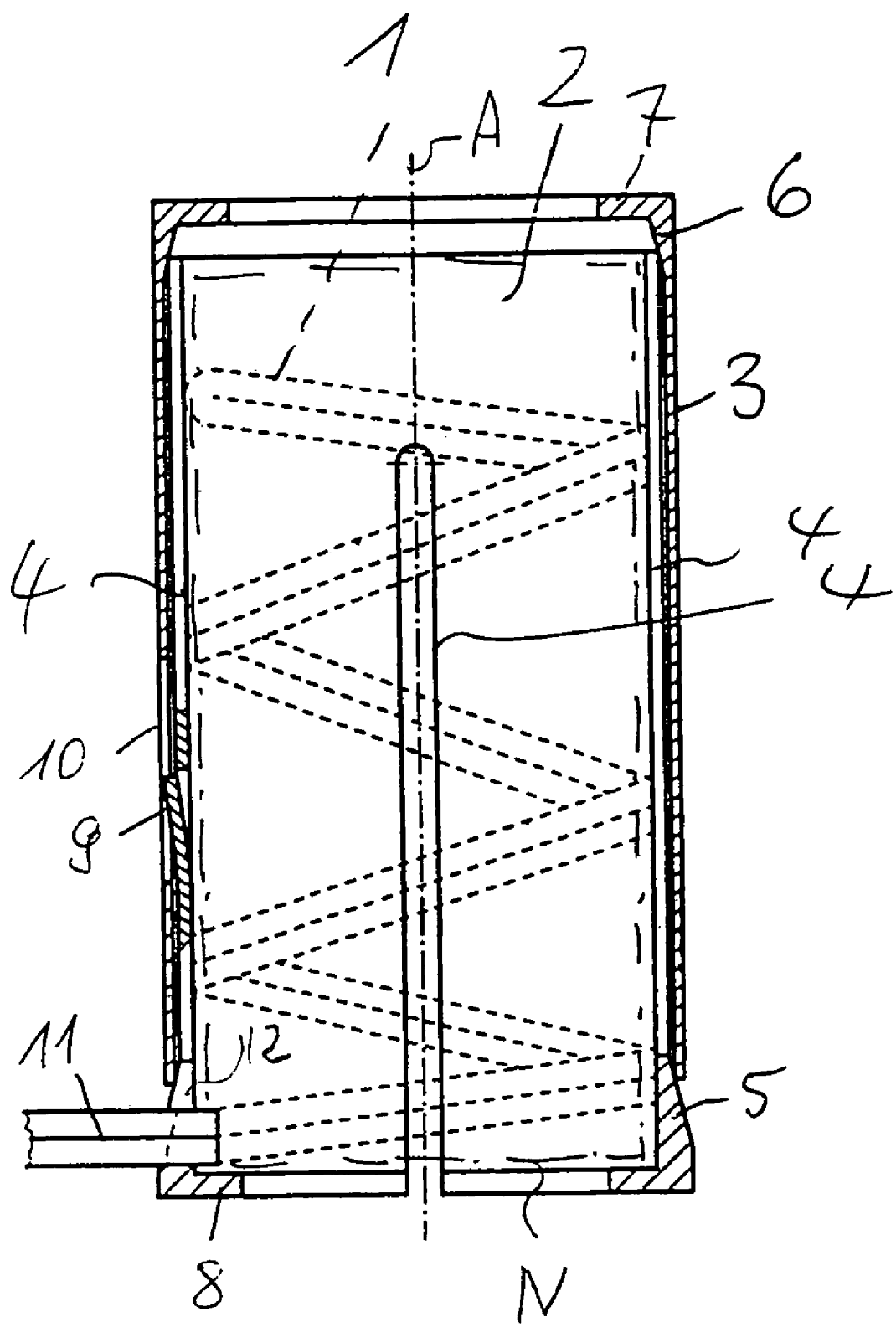

ELECTRICAL SLEEVE HEATER

FIELD OF THE INVENTION

The present invention relates to an electrical sleeve heater. More particularly this invention concerns such a heater used on a nozzle of an injection-molding apparatus.

BACKGROUND OF THE INVENTION

It is standard to heat a machine part, such as an injection-molding nozzle, by fitting it with an electric sleeve heater that is engaged snugly around the part and energized so as to keep the part at a predetermined temperature.

Such a sleeve heater comprises a resistance-type heater coil whose inside diameter is slightly greater than that of the part over which it is to be fitted. Frequently heat-distributing material is provided inside the coil. In order to tighten the coil, it is provided with an external clamping arrangement that urges its inner surface into good heat-transmitting contact with the part to be heated. Such a clamping arrangement can include an outer sleeve provided with a wedge-type screw-operated tightening system that reduces the coil's diameter. Such an arrangement makes the heater fairly bulky so it is difficult to fit in a restricted space, and substantially complicates the installation and use of the sleeve heater.

It is furthermore known to provide a screw-type tangential tightener which is somewhat more compact, but which nonetheless still is difficult to use with closely spaced nozzles. When the part being heated is of an exactly determined size, it is known to slip over the coil an outer sleeve that is dimensioned to compress it to the exact inner diameter desired, and then solder it in place before fitting the coil over the part. This latter arrangement is problematic in that any variation in size makes the heater impossible to install or so loose when installed as to be ineffective.

OBJECTS OF THE INVENTION

It is therefore an object of the present invention to provide an improved electrical sleeve heater.

Another object is the provision of such an improved electrical sleeve heater which overcomes the above-given disadvantages, that is which is very compact and of simple construction.

A further object is to provide such a sleeve heater that can easily be tightened around the part it is fitted to.

SUMMARY OF THE INVENTION

A sleeve heater has according to the invention an electrical and generally cylindrical heater coil centered on an axis and shaped to fit over a part to be heated, a radially compressible and generally cylindrical inner sleeve snugly coaxially surrounding the heater coil, and a radially generally inextensible and generally cylindrical outer sleeve fitted coaxially over the inner sleeve. The outer sleeve has an inner surface bearing tightly radially inward on the inner sleeve and radially compressing the inner sleeve and the coil inward.

Thus with this arrangement the subassembly comprised of the coil and the inner sleeve in which the coil is permanently mounted is slipped over the part to be heated. Then the outer sleeve, whose inside diameter is at least partially smaller than the outside diameter of the inner sleeve, is forced axially over the inner sleeve to radially compress it and force the coil into good heat-transmitting contact with the part. Such a system is extremely simple and very compact. Removal requires merely that the outer sleeve be pulled off, thereby allowing the inner sleeve and coil to loosen so they can also be removed.

The inner sleeve in accordance with the invention is formed with at least one axially open and extending slot. Normally it is formed with two or more such axially extending and axially oppositely open slots that are angularly equispaced, with alternate slots open axially in opposite directions. This constructions makes the inner sleeve highly radially compressible while still being one piece.

The inner sleeve according to the invention has an axially outwardly flared outer surface engageable with an end of the outer sleeve. Similarly the outer sleeve has an axially tapered inner surface axially engageable with an end of the inner sleeve. Both these frustoconical surfaces are about 10 mm long. Thus when the outer sleeve is forced over the inner sleeve, a high degree of compression is achieved at the two ends, ensuring excellent heat transmission between the coil and the part it is fitted over.

The inner sleeve has an end formed with a radially inwardly projecting rim, as does the outer sleeve. These rims contain the nozzle so that the inner sleeve and coil can be fitted over a nozzle before same is installed, and the nozzle will be trapped between the rims for ease of handling.

In addition according to the invention the inner sleeve has an axially outwardly projecting tab and the outer sleeve is formed with a cutout in which the tab fits when the sleeves are fitted together. Thus once the outer sleeve is slipped into place, the tab locks them axially together. The cutout in the outer sleeve is axially longer than the tab to allow some relative axial shifting. In addition the tab is directed outward so that it offers modest resistance to outward sliding of the outer sleeve and great resistance to rotation of the outer sleeve on the inner sleeve. Nonetheless the outer sleeve can be pulled forcibly back off the inner sleeve, in which case the inner edge of the cutout cams the tab back in.

The inner sleeve is formed with a radially throughgoing holes. The coil has ends extending through the hole.

BRIEF DESCRIPTION OF THE DRAWING

The above and other objects, features, and advantages will become more readily apparent from the following description, reference being made to the accompanying drawing whose sole FIGURE is an axial section through a sleeve heater according to the invention.

SPECIFIC DESCRIPTION

As seen in the drawing, a sleeve heater according to the invention basically comprises a helicoidal resistance-type coil 1 centered on an axis A and coaxially surrounded by a cylindrical inner metallic sleeve 2 and a cylindrical outer metallic sleeve 3. The coil 1 is fitted around a cylindrical nozzle indicated in dot-dash lines at N.

The inner sleeve 2 is formed here with four axially extending and angularly equispaced slots 4, two open in one axial direction and two in the opposite axial direction. These slots 4 make the sleeve 2 radially compressible. In addition the inner sleeve 2 is formed with a thickened lower end having an outwardly flaring frustoconical outer surface 5 and a radially inwardly projecting planar lip or rim 8. The lower end of the inner sleeve 2 is also formed with a radially throughgoing hole 12 through which ends 11 of the coil 1 can extend radially.

The outer sleeve 3 is unslotted so that it is neither radially compressible or expansible, at least compared to the highly radially compressible inner sleeve 2. It has a thickened upper end having an inwardly tapering frustoconical inner surface 6 and a radially inwardly projecting planar lip or rim 7. In addition the inner sleeve 2 is formed with a radially outwardly bent tab 9 that fits in a cutout or hole 10 of the outer sleeve 3 which is axially considerably longer than the tab 9. Both the surfaces 5 and 6 are about 10 mm long.

In use the coil 1 and inner sleeve 2 are typically fitted over the nozzle N in a snug fit. Then the outer sleeve 3 is forced over the inner sleeve 2, compressing it radially inward and pressing the coil 1 into good heat-conducting engagement with the nozzle N. In particular as the surface 6 engages the upper end of the sleeve 2 and the surface 5 engages the lower end of the sleeve 3, these ends are compressed inward considerably, forming a very tight fit of the coil 1 on the nozzle N.

I claim:

1. A sleeve heater comprising:
   an electrical and generally cylindrical heater coil centered on an axis and shaped to fit over a part to be heated;
   a radially compressible and generally cylindrical inner sleeve snugly coaxially externally surrounding the heater coil, radially inwardly bearing on the coil, and having an axially outwardly projecting tab; and
   a radially generally inextensible and generally cylindrical outer sleeve fitted coaxially over the inner sleeve and having an inner surface bearing tightly radially inward on the inner sleeve and radially compressing the inner sleeve and the coil inward, the outer sleeve being formed with a cutout in which the tab fits when the sleeves are fitted together.

2. The electrical sleeve heater defined in claim 1 wherein the inner sleeve is formed with at least one axially open and extending slot.

3. The electrical sleeve heater defined in claim 1 wherein the inner sleeve is formed with two axially extending and axially oppositely open slots.

4. The electrical sleeve heater defined in claim 3 wherein the slots are angularly equispaced.

5. The electrical sleeve heater defined in claim 1 wherein the inner sleeve has an axially outwardly flared outer surface engageable with an end of the outer sleeve.

6. The electrical sleeve heater defined in claim 5 wherein the outer surface is about 10 mm long.

7. The electrical sleeve heater defined in claim 1 wherein the outer sleeve has an axially tapered inner surface axially engageable with an end of the inner sleeve.

8. The electrical sleeve heater defined in claim 7 wherein the tapered inner surface is about 10 mm long.

9. The electrical sleeve heater defined in claim 1 wherein the outer sleeve has a radially inwardly projecting rim.

10. The electrical sleeve heater defined in claim 1 wherein the inner sleeve has an axially outwardly flared outer surface engageable with an end of the outer sleeve.

11. The electrical sleeve heater defined in claim 1 wherein the outer sleeve has an axially tapered inner surface axially engageable with an end of the inner sleeve.

12. The electrical sleeve heater defined in claim 1 wherein the inner sleeve is formed with at least one axially open and extending slot.

13. The electrical sleeve heater defined in claim 1 wherein both sleeves are of metal.

14. The electrical sleeve heater defined in claim 1 wherein the inner sleeve has an outside diameter and the outer sleeve baa an inside diameter that is smaller than the inner-sleeve outside diameter, whereby when the outer sleeve is fitted over the inner sleeve it radially compresses the inner sleeve.

* * * * *